US010011365B2

(12) United States Patent
Shephard et al.

(10) Patent No.: US 10,011,365 B2
(45) Date of Patent: Jul. 3, 2018

(54) AFT PYLON FAIRING FOR AIRCRAFT

(71) Applicant: BOMBARDIER INC., Dorval (CA)

(72) Inventors: Kevin Shephard, Morin-Heights (CA); Jeffrey E. Young, Wichita, KS (US); Lyle Beedy, Derby, KS (US)

(73) Assignee: BOMBARDIER INC., Dorval, Quebec (CA)

( * ) Notice: Subject to any disclaimer, the term of this patent is extended or adjusted under 35 U.S.C. 154(b) by 368 days.

(21) Appl. No.: 14/769,957

(22) PCT Filed: Feb. 28, 2014

(86) PCT No.: PCT/IB2014/000223
§ 371 (c)(1),
(2) Date: Aug. 24, 2015

(87) PCT Pub. No.: WO2014/135948
PCT Pub. Date: Sep. 12, 2014

(65) Prior Publication Data
US 2016/0001888 A1    Jan. 7, 2016

Related U.S. Application Data

(60) Provisional application No. 61/773,244, filed on Mar. 6, 2013.

(51) Int. Cl.
B64C 1/38        (2006.01)
B64D 29/06       (2006.01)
(Continued)

(52) U.S. Cl.
CPC ............... B64D 29/06 (2013.01); B64C 7/02 (2013.01); B64D 29/02 (2013.01); B64D 33/04 (2013.01); B64D 45/00 (2013.01)

(58) Field of Classification Search
CPC ........ B64D 29/06; B64D 29/02; B64D 33/04; B64D 45/00; B64D 27/12; B64C 7/02
See application file for complete search history.

(56) References Cited

U.S. PATENT DOCUMENTS 2,009,098 A    7/1935  Smith et al.
3,051,528 A *  8/1962  Rogers .................... B60C 23/18
                                              188/218 R
(Continued)

FOREIGN PATENT DOCUMENTS

CN    101801789 A    8/2010
CN    202518455 U    11/2012
(Continued)

OTHER PUBLICATIONS

International Search Report and Written Opinion dated Sep. 1, 2014, for International Patent Application No. PCT/IB2014/000223.
(Continued)

Primary Examiner — Assres H Woldemaryam
(74) Attorney, Agent, or Firm — Karceski IP Law, PLLC

(57) ABSTRACT

Aft fairings for aircraft pylons are disclosed. In one example, a fairing includes: two opposite side panels extending generally along a longitudinal direction of the fairing; a plurality of transverse ribs interconnecting the two opposite side panels; and a heat shield for exposure to a primary flow of an aircraft engine. The heat shield includes transversely opposed side end portions and a mid portion disposed between the transversely opposed side end portions. The heat shield is secured to the ribs via the mid portion of the heat shield. The transversely opposed side end portions are permitted to move outwardly from the mid portion due to thermal expansion of the heat shield.

28 Claims, 9 Drawing Sheets

(51) Int. Cl.
*B64C 7/02* (2006.01)
*B64D 29/02* (2006.01)
*B64D 33/04* (2006.01)
*B64D 45/00* (2006.01)

(56) References Cited

U.S. PATENT DOCUMENTS

| | | | | |
|---|---|---|---|---|
| 5,906,097 A * | 5/1999 | Hebert | ............... | B64C 23/00 |
| | | | | 244/53 R |
| 8,118,251 B2 | 2/2012 | Suciu et al. | | |
| 9,688,412 B2 * | 6/2017 | Peyruseigt | ............ | B64D 27/26 |
| 2009/0095443 A1 * | 4/2009 | Connelly | ............... | B64D 33/04 |
| | | | | 165/51 |
| 2009/0200418 A1 * | 8/2009 | Beaufort | ............... | B64D 27/26 |
| | | | | 244/54 |
| 2010/0051743 A1 * | 3/2010 | Dumont | ............... | B64D 29/02 |
| | | | | 244/54 |
| 2011/0011972 A1 * | 1/2011 | Vache | ............... | B64D 27/26 |
| | | | | 244/54 |
| 2011/0155847 A1 * | 6/2011 | Journade | ............... | B64D 29/02 |
| | | | | 244/54 |
| 2013/0105622 A1 * | 5/2013 | Journade | ............... | B64D 29/02 |
| | | | | 244/54 |

FOREIGN PATENT DOCUMENTS

CN 103057709 A 4/2013
EP 2583900 A2 4/2013

OTHER PUBLICATIONS

Chinese Office Action dated Apr. 5, 2016, for Chinese Patent Application No. 201480011859.0.

* cited by examiner

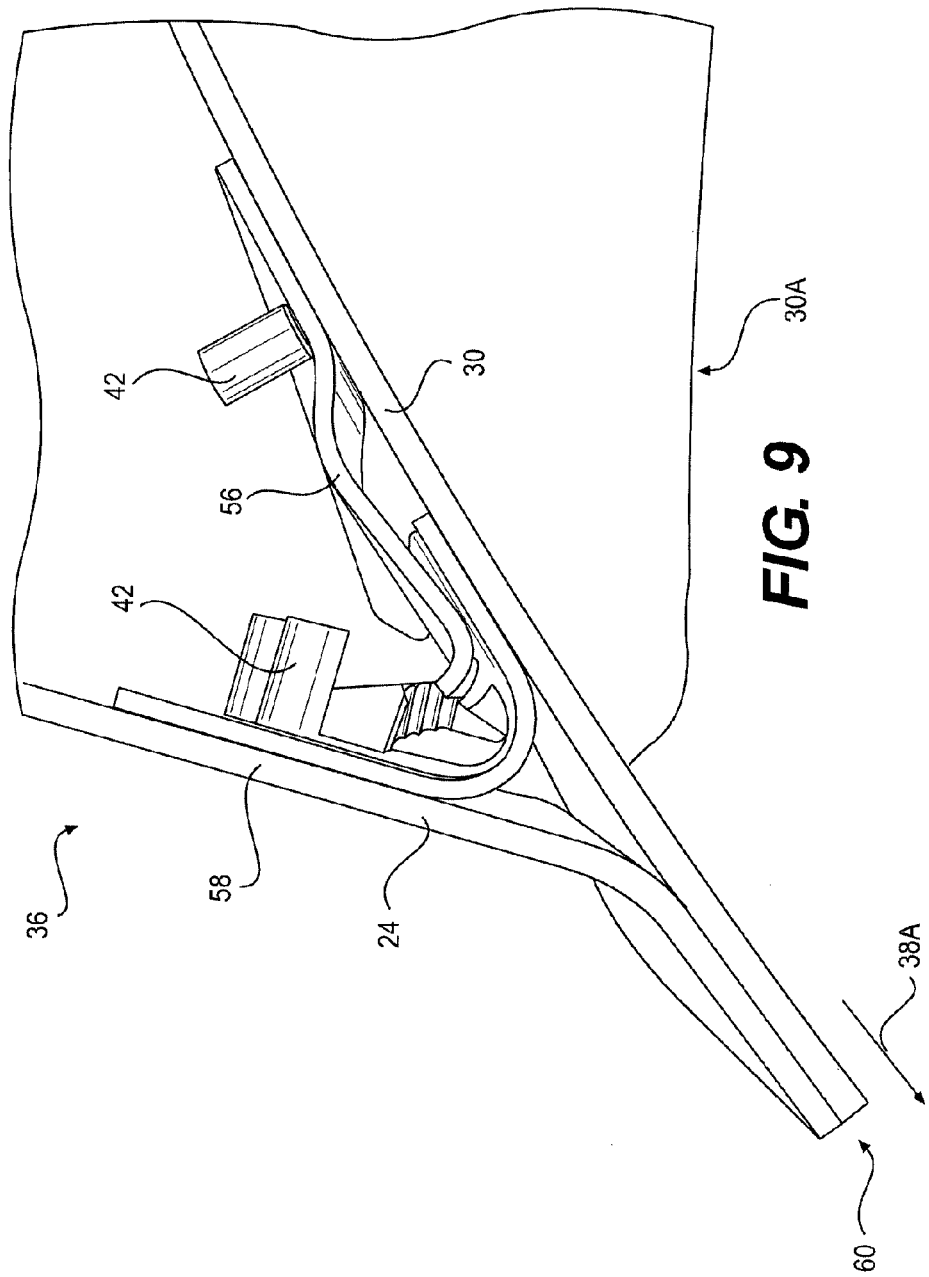

AFT PYLON FAIRING FOR AIRCRAFT

CROSS-REFERENCE TO RELATED APPLICATION(S)

This is a National Stage Entry into the United States Patent and Trademark Office from International Patent Application No. PCT/IB2014/000223, having an international filing date of Feb. 28, 2014, and which relies for priority on U.S. Provisional Patent Application Ser. No. 61/773,244, filed on Mar. 6, 2013, the entire contents of both of which are incorporated herein by reference.

TECHNICAL FIELD

The disclosure relates generally to aircraft fairings, and more particularly to an aft fairing of a pylon for protecting the pylon from hot engine exhaust gases.

BACKGROUND OF THE ART

Aircraft engines are typically supported to aircraft structure such as aircraft wings via pylons. A typical pylon can comprise a box structure configured to support an engine and also allow forces generated by such engine to be transmitted to the structure of the aircraft during use. The pylon can also allow transport of fuel, of electricity, hydraulic line(s) and air between the engine and the aircraft. Such pylons can also comprise aerodynamic fairing elements secured to the box structure. Depending on their locations, some fairing elements may be exposed to hot exhaust gases exiting the engine during use and hence may undergo thermal expansion.

The thermal expansion of fairing elements in conventional pylons can induce stresses in structural elements of the pylon and can in some instances also cause deformation of the fairing elements. Consequently, such deformation of fairing elements can affect the aerodynamic quality of such fairing elements in certain areas.

Improvement is therefore desirable.

SUMMARY

The disclosure describes systems and devices relating to aircraft fairings. In particular, the systems and devices disclosed herein relate to aft fairings of pylons suitable for securing engines to structure of aircraft.

In one aspects, for example, the disclosure describes an aft fairing of a pylon where the pylon is suitable for securing an engine to structure of an aircraft.

The fairing comprises:

two opposite side panels extending generally along a longitudinal direction of the fairing;

a plurality of transverse ribs interconnecting the two opposite side panels, the ribs being spaced apart from each other along the longitudinal direction; and a heat shield for exposure to a primary flow of the engine, the heat shield extending generally along the longitudinal direction, the heat shield comprising transversely opposed side end portions and a mid portion disposed between the transversely opposed side end portions, the heat shield being secured to the ribs via the mid portion of the heat shield, the transversely opposed side end portions being permitted to move outwardly from the mid portion due to thermal expansion of the heat shield.

In another aspect, the disclosure describes an aft fairing of a pylon where the pylon is suitable for securing an engine to structure of an aircraft. The fairing comprises:

two opposite side panels extending generally along a longitudinal direction of the fairing;

a plurality of transverse ribs interconnecting the two opposite side panels, the ribs being spaced apart from each other along the longitudinal direction; and a heat shield for exposure to a primary flow of the engine, the heat shield extending generally along the longitudinal direction, the heat shield comprising transversely opposed side end portions and a mid portion disposed between the transversely opposed side end portions, the heat shield being secured to the ribs via the mid portion of the heat shield, the transversely opposed side end portions being secured to respective ones of the side panels via a non-rigid connection permitting movement of the transversely opposed side end portions relative to the respective ones of the side panels due to thermal expansion of the heat shield.

In another aspect, the disclosure provides an aft fairing of a pylon where the pylon is suitable for securing an engine to structure of an aircraft. The fairing comprises:

two opposite side panels extending generally along a longitudinal direction of the fairing;

a plurality of transverse ribs interconnecting the two opposite side panels, the ribs being spaced apart from each other along the longitudinal direction; and a heat shield for exposure to a primary flow of the engine, the heat shield extending generally along the longitudinal direction, the heat shield comprising transversely opposed side end portions and a mid portion disposed between the transversely opposed side end portions, the mid portion of the heat shield being secured to at least one of the transverse ribs via a connection permitting longitudinal movement of the mid portion of the heat shield relative to the at least one of the transverse ribs due to thermal expansion of the heat shield.

In other aspects, the present disclosure describes pylons comprising the aft fairings described herein. The present disclosure also describes aircraft comprising one or more aft fairings described herein.

Further details of these and other aspects of the subject matter of this application will be apparent from the detailed description and drawings included below.

DESCRIPTION OF THE DRAWINGS

Reference is now made to the accompanying drawings, in which:

FIG. 9 is cross-sectional elevation view of a connection mechanism between the heat shield and a side panel taken along line 4-4 in FIG. 3.

DETAILED DESCRIPTION

Aspects of various embodiments are described through reference to the drawings.

Figure 1:
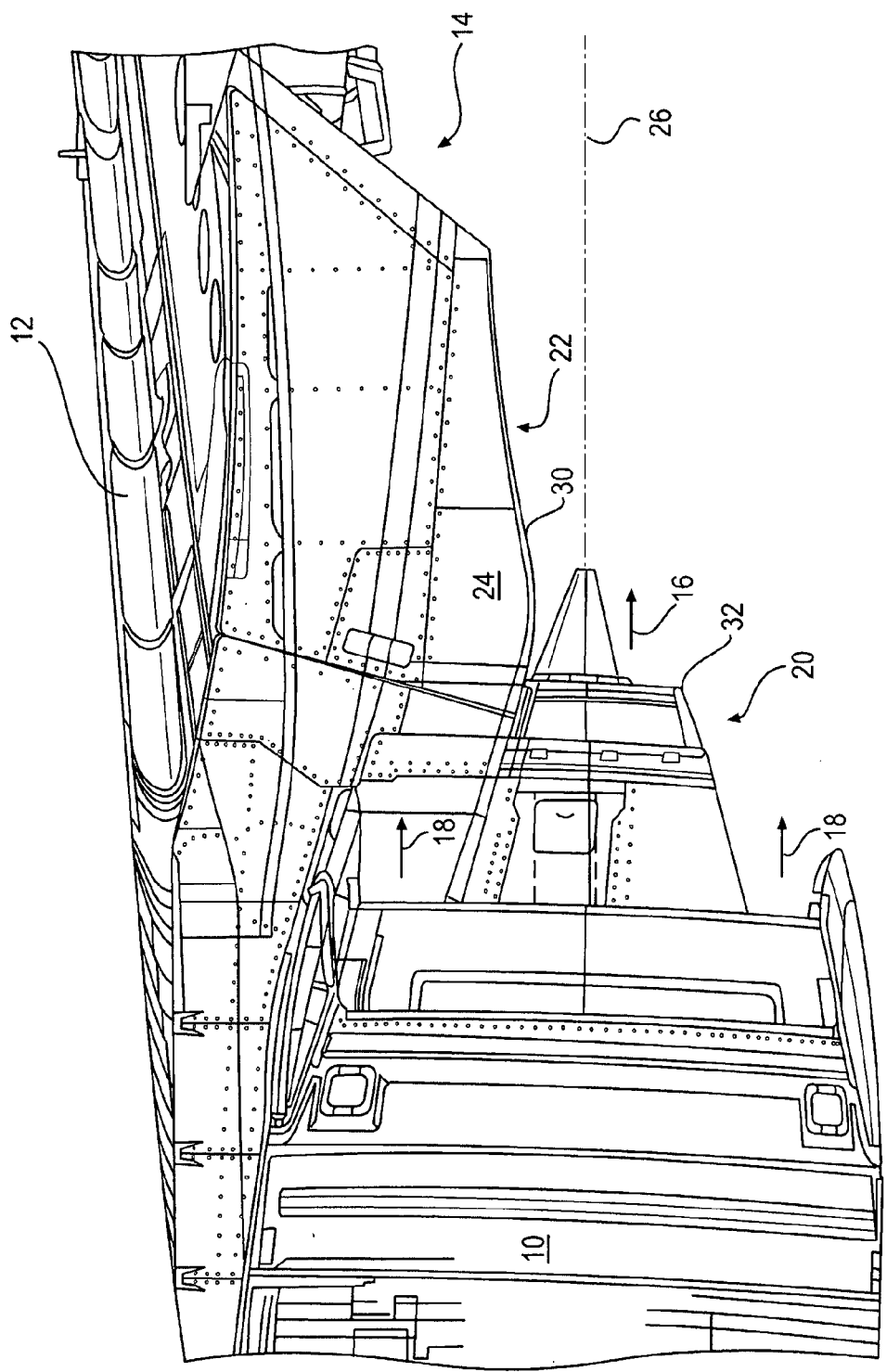
FIG. 1 is a partial side elevation view of an aircraft engine secured to a wing of an aircraft via a pylon.

FIG. 1 illustrates a partial side elevation view of aircraft engine 10 secured to wing 12 of an aircraft via pylon 14. Pylon 14 may comprise structural members (not shown) configured to support engine 10 (e.g., under wing 12) and to allow forces (e.g., thrust) generated by engine 10 to be transmitted to structure of the aircraft during use (e.g., flight). Pylon 14 may comprise aerodynamic fairing elements that cover the structural members. Pylon 14 may also allow integration therein of components of fuel, electricity, hydraulic and air systems. Engine 10 may comprise a conventional or other type of gas turbine engine suitable for use in aircraft applications. For example, engine 10 may comprise a turbofan or a turboprop type of engine. The aircraft to which engine 10 and pylon 14 may be mounted may include, for example, any suitable aircraft such as corporate, private, commercial or any other type of aircraft. For example, the aircraft may be a narrow-body, twin engine jet airliner.

Engine 10 may produce a primary flow of exhaust gases represented by arrow 16 and a secondary flow of exhaust gases represented by arrows 18 out of outlet 20 of engine 10 during use. The primary flow 16 may comprise relatively hot combustions gases. For example, in case of engine 10 being a turbofan engine, primary flow of exhaust gases 16 may comprise the combustion gases exiting the core of the turbofan engine while the secondary flow of exhaust gases 18 may comprise air exiting the bypass duct of the turbofan engine. Accordingly, primary flow 16 may be significantly hotter than secondary flow 18.

Pylon 14 may comprise one or more aerodynamic fairing elements. For example pylon 14 may comprise rear lower aft fairing 22. Lower aft fairing 22 may serve as a heat or anti-fire barrier and also establish substantial aerodynamic continuity between the outlet of engine 10 and pylon 14. Portions of lower aft fairing 22 may be exposed to (hot) primary flow 16 and/or (cold) secondary flow 18. Accordingly, pylon 14 may be subjected to temperature gradients during use. Lower aft fairing 22 may be in the form of a structural box comprising two opposite side panels 24 extending generally along a longitudinal direction 26 (e.g., axis) of lower aft fairing 22. Longitudinal direction 26 as referenced herein may, for example, be substantially parallel to and/or coaxial with a central axis of engine 10. Lower aft fairing 22 may comprise a plurality of transverse ribs 28 (shown in FIG. 3) interconnecting opposite side panels 24, transverse ribs 28 may be spaced apart from each other along longitudinal direction 26. Side panels 24 may be exposed mainly to secondary flow 18. Lower aft fairing 22 may also comprise heat shield 30 which may be exposed mainly to primary flow 16 of engine 10. Heat shield 30 may also extend generally along longitudinal direction 26 and may form a lower side (e.g., floor) of the box structure formed by lower aft fairing 22.

Figure 2:
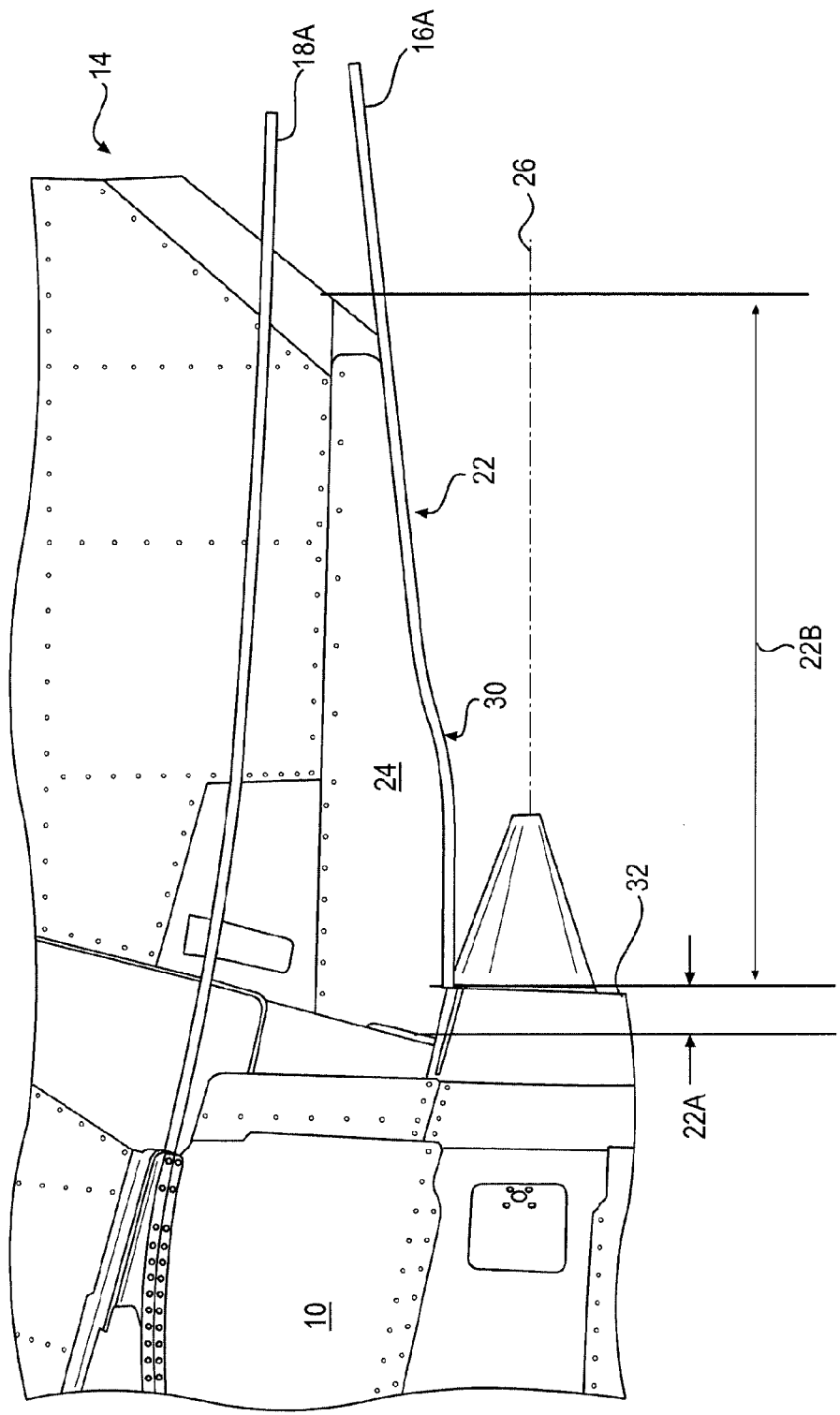
FIG. 2 is a partial side elevation view of the engine and pylon of FIG. 1 showing flow lines for a primary flow and a secondary flow of the engine.

FIG. 2 is a partial side elevation view of engine 10 together with pylon 14. FIG. 2 shows flow line 16A along which primary flow 16 may flow and flow line 18A along which secondary flow 18 may flow. Flow line 16A may also represent a generally longitudinal profile of heat shield 30. For example, flow line 16A may be representative of cross-sectional surface profile of heat shield 30 taken along longitudinal direction 26. For example, as shown in FIG. 2, the longitudinal cross-sectional profile of heat shield 30 may follow a slight S-shaped curve.

Lower aft fairing 22 may comprise a relatively cold section 22A and a relatively hot section 22B. Cold section 22A may be disposed longitudinally upstream (forward) of nozzle 32 through which primary flow 16 may exit engine 10. Hot section 22B may be disposed longitudinally downstream (aft) of nozzle 32. Side panels 24 may be mainly exposed to secondary flow 18 and a relatively large portion of heat shield 30 may be disposed in hot section 22B and may be mainly exposed to primary flow 16.

Figure 3:
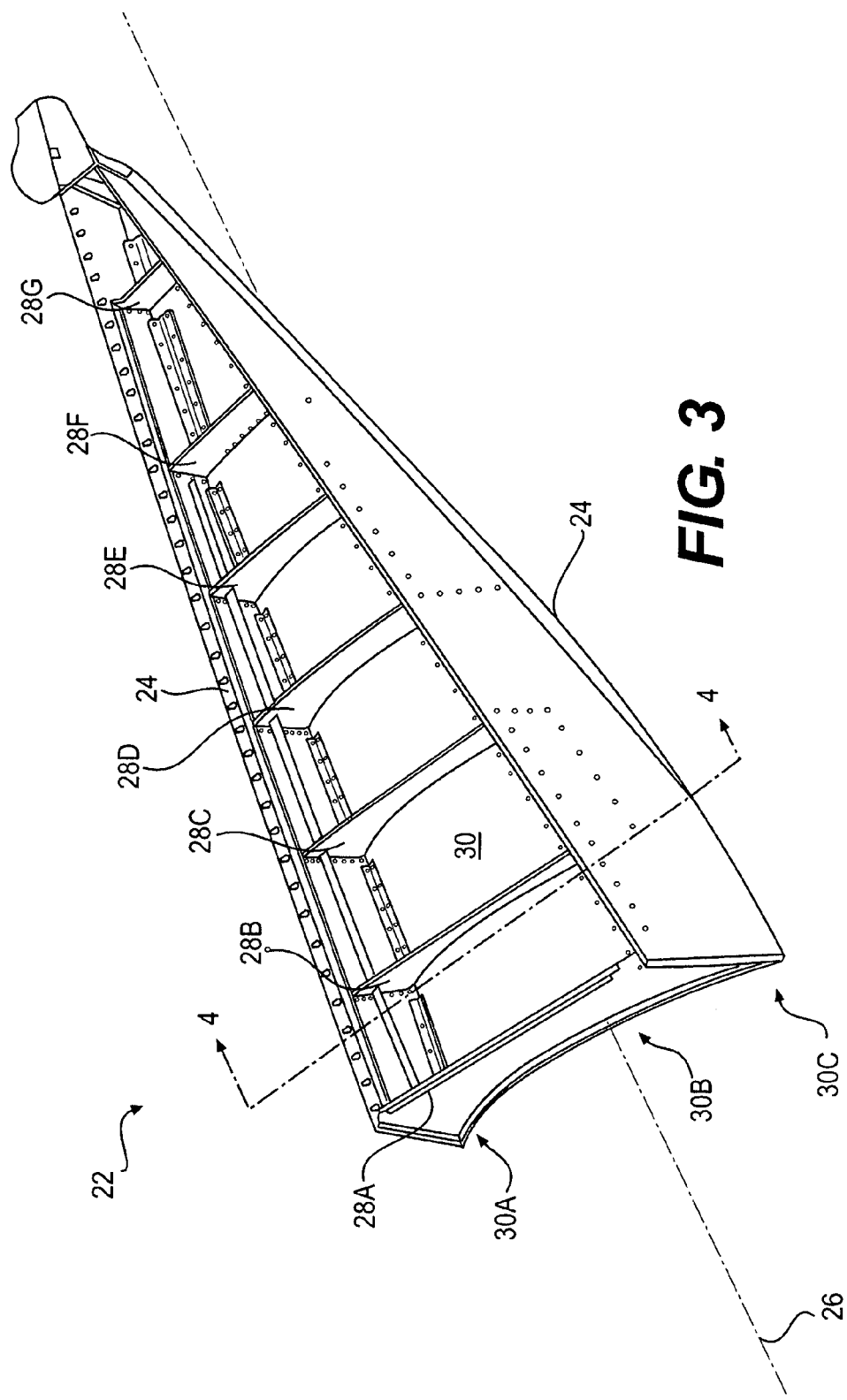
FIG. 3 is an axonometric view of a lower aft fairing of the pylon of FIG. 1.

FIG. 3 is an axonometric view of lower aft fairing 22 of pylon 14 showing the inside of lower aft fairing 22. As mentioned above, lower aft fairing 22 may comprise one or more transverse ribs 28 (e.g., 28A-28G) that interconnect opposite side panels 24 and that are spaced-apart along longitudinal direction 26. Transverse rib 28A may be a forward closing rib of lower aft fairing 22. As explained further below, opposite side panels 24 may be secured to transverse ribs 28 and heat shield 30 may also secured to transverse ribs 28.

Figure 4:
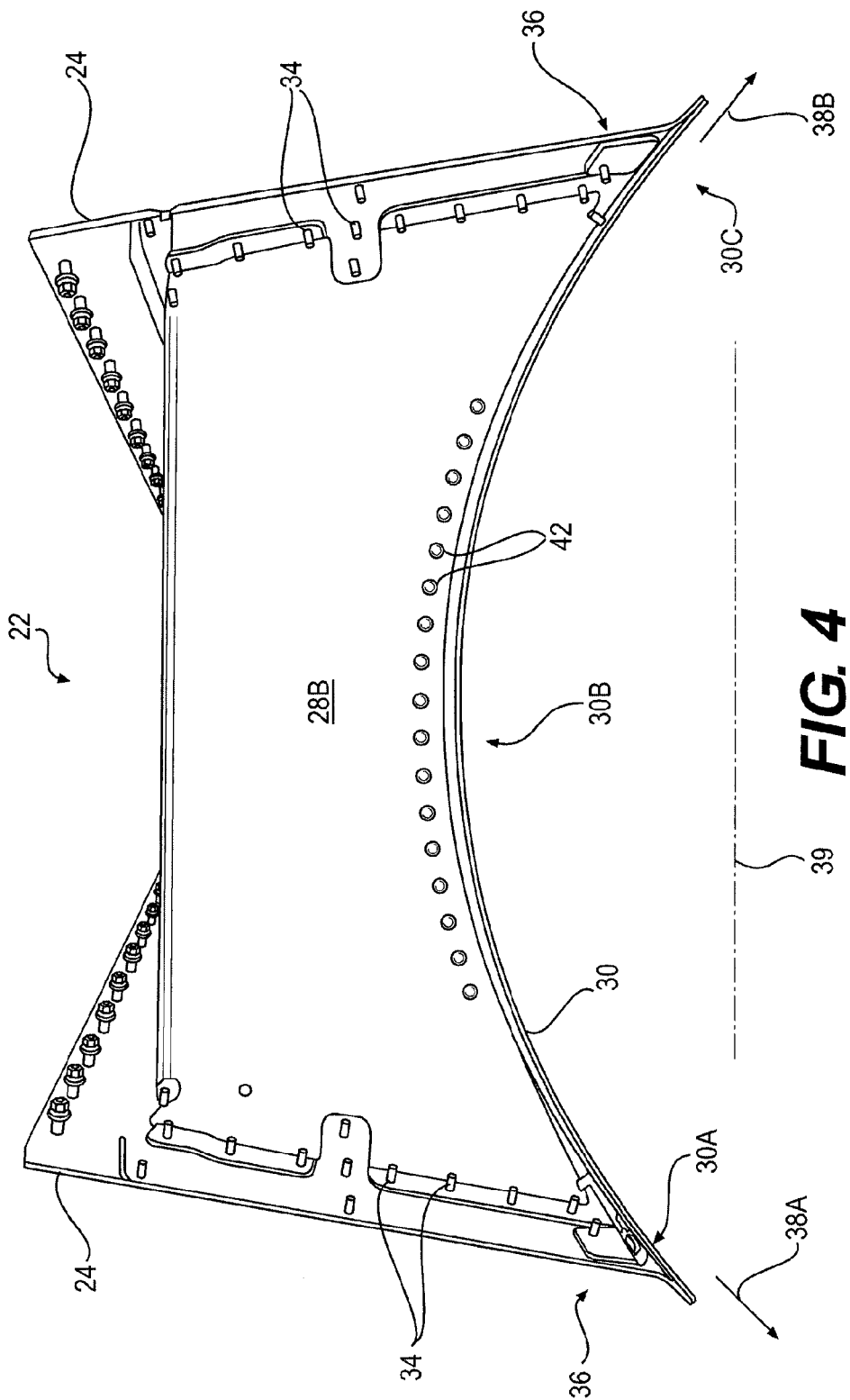
FIG. 4 is a transverse cross-sectional elevation view of the lower aft fairing of FIG. 3 taken along line 4-4 in FIG. 3.

FIG. 4 is a transverse cross-sectional elevation view of the lower aft fairing 22 taken along line 4-4 in FIG. 3. Opposite side panels 24 may be secured to ribs 28 by rivets 34. Heat shield 30 may comprise transversely opposed side end portions 30A and 30C and mid portion 30B disposed between transversely opposed side end portions 30A and 30C. Mid portion 30B may be substantially equally spaced from transversely opposed side end portions 30A and 30C. For example, mid portion 30B may comprise a transversely middle portion of heat shield 30 extending longitudinally along heat shield 30. Heat shield 30 may be secured to ribs 28 via mid portion 30B of heat shield 30 as explained below in relation to FIG. 5.

Transversely opposed side end portions 30A and 30C may be secured to corresponding side panels 24 respectively via one or more connection mechanisms 36. Connection mechanisms 36 may be non-rigid so as to permit transversely opposed side end portions 30A and 30C to move outwardly from mid portion 306 due to thermal expansion of heat shield 30. For example, transversely opposed side end portions 30A and 30C of heat shield 30 may be permitted to move outwardly substantially along arrows 38A and 38B respectively. For example, the movement of transversely opposed side end portions 30A and 30C may be substantially tangential to the transverse curvature of heat shield 30 and outwardly relative to mid portion 30B.

FIG. 4 also shows a cross-sectional profile of heat shield 30 taken along a transverse direction 39 (i.e., substantially orthogonal to longitudinal direction 26). Heat shield 30 may be doubly curved such that it may comprise a curvature relative to longitudinal direction 26 and also a curvature relative to transverse direction 39. The transverse profile of heat shield 30 may follow part of a circular path or may follow any other type(s) of curvature(s) suitable for heat shield 30. For example, at least a portion of the transverse profile of heat shield 30 may be generally arcuate. For example, the arcuate transverse profile of heat shield 30 may, in some regions of heat shield 30, have a central axis that corresponds to longitudinal direction 26 (see FIG. 3). The transverse cross-sectional profile of heat shield 30 may also be substantially arcuate at other positions along longitudinal direction 26. In some embodiments, transversely opposed side end portions 30A and 30C may be substantially symmetrical about mid portion 30B at one or more positions along longitudinal axis 26.

Figure 5:
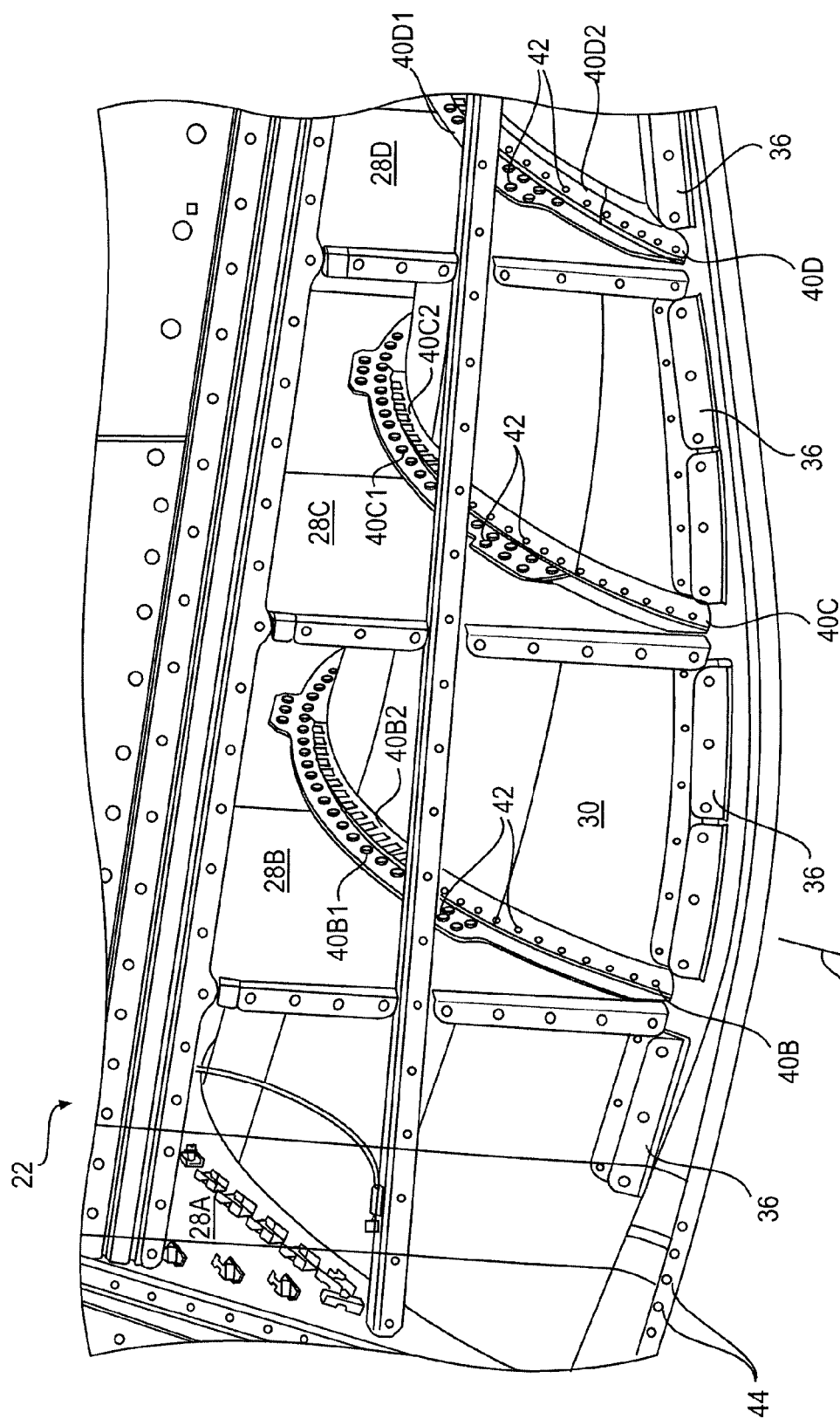
FIG. 5 is a partial axonometric view of an inside of the lower aft fairing of FIG. 3 showing connections between transverse ribs and a heat shield of the pylon.

FIG. 5 is a partial axonometric view of an inside of lower aft fairing 22 where one of the side panels 24 has been removed to provide visual access to the inside of lower aft fairing 22. FIG. 5 shows exemplary brackets 40 (i.e., 40B, 40C and 40D) used to secure heat shield 30 to transverse ribs 28. Brackets 40 may serve to secure mid portion 30B of heat shield 30 to one or more of transverse ribs 28. Heat shield 30 may extend across some or all of transverse ribs 28A-28G. For example, heat shield 30 may comprises multiple pieces or a single piece extending across all of transverse ribs 28A-28G. For example, heat shield 30 may extend across three or more ribs 28. One or more of brackets 40 may each be in the form of an angled member having an upright portion (e.g., 40B1, 40C1 and 40D1) for securing to transverse ribs 28 using one or more rivets 42 and a base portion (e.g., 40B2, 40C2 and 40D2) for securing to heat shield 30 using one or more rivets 42.

Base portions (e.g., 40B2, 40C2 and 40D2) may extend substantially entirely transversely across a portion of heat shield 30 adjacent to respective transverse ribs 28. Accordingly, heat shield 30 may be secured to brackets 40 using rivets 42 spaced across substantially entirely and transversely across a portion of heat shield 30 adjacent to the respective transverse ribs 28. However, upright portions (e.g., 40B1, 40C1 and 40D1) may only be secured to respective transverse ribs 28 using rivets 42 spaced across a smaller transverse span of heat shield 30. For example, upright portions (e.g., 40B1, 40C1 and 40D1) may only be secured to respective transverse ribs 28 adjacent mid portion 30B of heat shield 30. Accordingly, upright portions (e.g., 40B1, 40C1 and 40D1) may only extend across a smaller transverse span than base portion (e.g., 40B2, 40C2 and 40D2). As explained further below this arrangement may permit transversely opposed side end portions 30A and 30C to move outwardly from mid portion 30B due to thermal expansion of the heat shield 30 when exposed to primary flow 16 of engine 10. The span across which upright portions (e.g., 40B1, 40C1 and 40D1) may be secured to respective transverse ribs 28 may be determined based on a predetermined amount of movement (e.g., extension, deformation) anticipated from heat shield 30 under predetermined operating conditions. Accordingly, the span across which upright portions (e.g., 40B1, 40C1 and 40D1) may be secured to respective transverse ribs 28 may be selected to avoid undesired deformation and stressing of heat shield 30, transverse ribs 28 and/or any other component of lower aft fairing 22 due to thermal expansion during operation.

While no bracket 40 is shown between heat shield 30 and forward closing rib 28A, it is understood that, in some embodiments, forward closing rib 28A and heat shield 30 could be secured using another bracket 40 similar to those used for attachment of heat shield 30 and other transverse ribs 28 disposed aft of forward closing rib 28A. Alternatively, heat shield 30 may be secured to forward closing rib 28A or to any other transverse rib 28 using other means.

Figure 6:
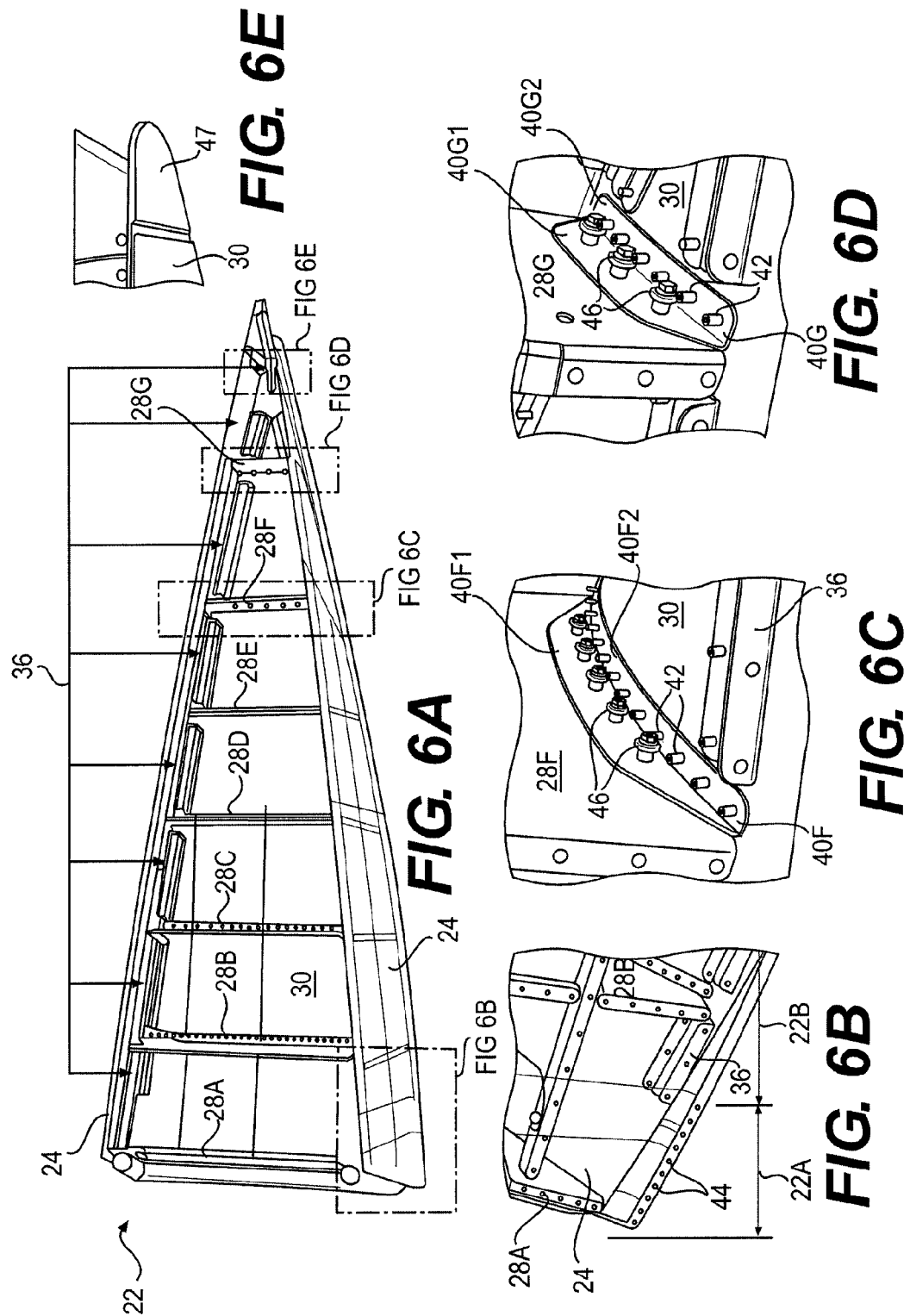
FIG. 6A is an axonometric view of the inside of the lower aft fairing of FIG. 3.
FIGS. 6B-6E are enlarged axonometric views of portions of the aft fairing of FIG. 3.

FIG. 6A shows a view of the inside of lower aft fairing 22 substantially from the top and FIGS. 6B-6E show enlarged views of selected portions of lower aft fairing 22.

FIG. 6B shows an enlarged axonometric view of lower aft fairing 22 near transverse rib 28A where side panel 24 is shown to be partially transparent. In cold section 22A of lower aft fairing 22, for example, thermal expansion of heat shield 30 may not be significant and it may be appropriate for a portion of heat shield 30 in cold section 22A be substantially rigidly secured to side panel 24 using one or more rivets 44. However, in hot section 22B of lower aft fairing 22, thermal expansion of heat shield 30 may be more significant and it may be appropriate for at least a portion of heat shield 30 (e.g., transversely opposed side end portions 30A, 30C) in hot section 22B to be secured to side panel 24 using one or more non-rigid connection mechanisms 36.

FIG. 6C shows an enlarged axonometric view of lower aft fairing 22 near transverse rib 28F and FIG. 6D shows an enlarged axonometric view of lower aft fairing 22 near transverse rib 28G. FIGS. 6C and 6D show another mechanism for securing heat shield 30 to transverse ribs 28F and 28G. While one or more forward transverse ribs (e.g., 28B, 28C and 28D) may be secured to mid portion 30B of heat shield 30 using the mechanisms shown in FIG. 5, one or more aft transverse ribs (e.g., 28F and 28G) may be secured to mid portion 30B of heat shield 30 using the mechanisms shown in FIGS. 6C and 6D. For example, the securing mechanism between aft transverse ribs 28F and 28G and mid portion 30B of heat shield 30 may be configured to permit some longitudinal movement of heat shield 30 relative to transverse ribs 28F and 28G due to thermal expansion of heat shield 30 when exposed to primary flow 16. For example, while bracket 40B may be substantially rigidly secured to heat shield 30 and also to transverse rib 28B via rivets 42, bracket 40F may be substantially rigidly secured to heat shield 30 via rivets but bracket 40F may be moveably secured to transverse rib 28F to permit movement of bracket 40F (and heat shield 30) in at least one degree of freedom relative to transverse rib 28F.

Base portions 40F2 and 40G2 of brackets 40F and 40G may be secured to heat shield 30 via rivets 42. However, upright portions 40F1 and 40G1 brackets 40F and 40G may be secured to transverse ribs 28F and 28G respectively to permit longitudinal movement of brackets 40F and 40G due to thermal expansion of heat shield 30. For example, upright portions 40F1 and 40G1 brackets 40F and 40G may be secured to transverse ribs 28F and 28G using one or more expansion assemblies 46, which will be described further below in relation to FIG. 7.

FIG. 6E shows an enlarged axonometric view of an interface between heat shield 30 and end plate 47 located at or near an aft portion of lower aft fairing 22. End plate 47 may be rigidly secured to structure of lower aft fairing 22. The interface between heat shield 30 and end plate 47 may permit movement of heat shield 30 relative to end plate 47 due to thermal expansion of heat shield 30. For example, while end plate 47 may be used to retain heat shield 30 in position, end plate 47 may permit substantially longitudinal movement (e.g., in a direction in a plane of heat shield 30) of heat shield 30 in relation to end plate 47.

Figure 7:
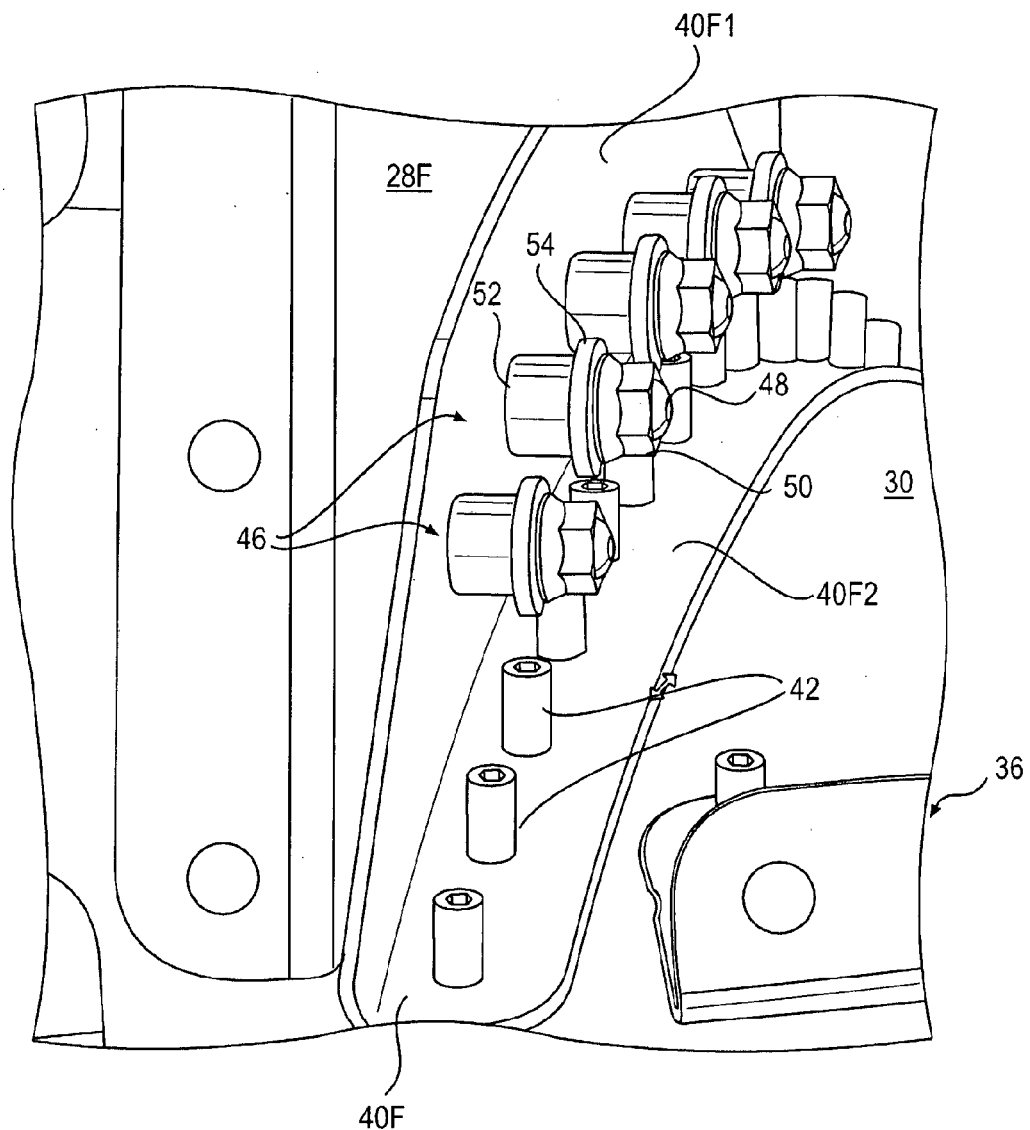
FIG. 7 is an enlarged axonometric view of a connection between one of the transverse ribs and the heat shield configured to permit thermal expansion of the heat shield.

FIG. 7 is an enlarged axonometric view of an exemplary connection between transverse rib 28F and heat shield 30 configured to permit thermal expansion of heat shield 30. As mentioned above, upright portion 40F1 of bracket 40F may be secured to transverse rib 28F via one or more expansion assemblies 46. For example, each expansion assembly 46 may comprise bolt 48, nut 50, spacer 52 and washer 54. Bolt 48 may be rigidly secured to transverse rib 28F. For example bolt 48 may comprise a head (not shown) on an opposite (i.e., forward) side of transverse rib 28F. Spacer 52 and washer 54 may be disposed on bolt 48 and secured (e.g., pressed) against transverse rib 28F via nut 50, which may be threaded on bolt 48. A predetermined pre-load may be applied to nut 50. Spacer 52 may have the form of a bushing along which upright portion 40F1 of bracket 40F may be permitted to move. For example, upright portion 40F1 of bracket 40F may comprise a corresponding hole for each expansion assembly 46 and the hole may be sized to permit passage of spacer 52. Accordingly, while expansion assemblies 46 may be secured to transverse rib 28F, sliding of upright portion 40F1 along spacers 52 may permit thermal expansion of heat shield 30 along the axis of bolts 48. Accordingly, expansion assemblies 46 may at least assist in guiding the longitudinal thermal expansion of heat shield 30.

Figure 8:
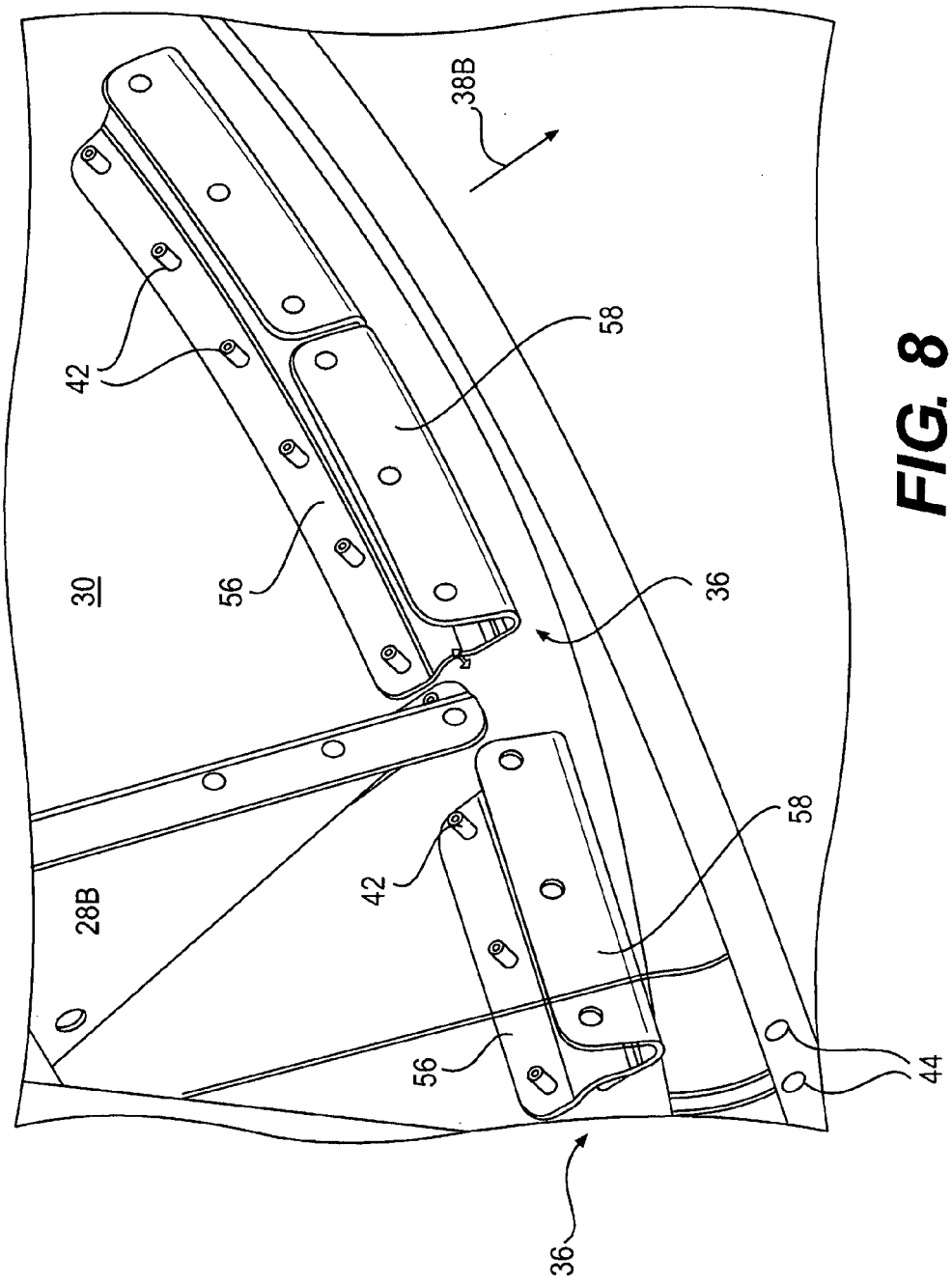
FIG. 8 is an axonometric view of an inside portion of the lower aft fairing of FIG. 3 with a side panel removed showing a connection mechanism between the heat shield and the removed side panel.

FIG. 8 shows an axonometric view of an inside portion of lower aft fairing 22 with a side panel removed showing non-rigid connection mechanisms 36 between heat shield 30 and side panel 24. Each connection mechanism 36 may comprise one or more spring clips 56 and one or more corresponding c-clips 58 (brackets). Spring clip 56 may be secured to heat shield 30 via rivets 42 and c-clip 58 may be secured to side panel 24 via other rivets 42 (shown in FIG. 9). Spring clip 56 and c-clip may engage each other to provide a non-rigid connection between heat shield 30 and side panel 24.

FIG. 9 is an end elevation view of non-rigid connection mechanism 36. The engagement of spring clip 56 and c-clip 58 (bracket) may flexibly bias transversely opposed side end portions 30A and 30C of heat shield 30 and side panel 24 towards each other. The biasing force provided by connection mechanism 36 may be selected to substantially maintain contact of heat shield 30 with side panel 24 at interface 60 during operation (e.g., flight). Accordingly, spring clip 56 may be subject to a certain amount of pre-load to achieve a desired biasing force. Connection mechanisms 36 may also permit movement (e.g., expansion) of heat shield 30 along arrows 38A, 38B by permitting relative sliding movement between one or more spring clips 56 and one or more c-clips 58. Connection mechanisms 36 may provide some resistance to relative movement between heat shield 30 and side panel 24 but such resistance may not be so significant as to cause undesired deformation of heat shield 30 due to thermal expansion. Also, the arrangement of non-rigid connection mechanism 36 and interface 60 between heat shield 30 and side panel 24 may, at least to some extent, guide the movement of transversely opposed side end portions 30A and 30C of heat shield 30 along arrows 38A and 38B respectively due to thermal expansion.

Heat shield 30 may comprise a material that can withstand exposure to primary flow 16 of engine 10 while maintaining the functional requirements of heat shield 30. For example, heat shield 30 may be made from a suitable nickel-based alloy sold under the trade name INCONEL. Since one or more of brackets 40 may be rigidly secured to and be in contact with heat shield 30, brackets 40 may be made from a material having a thermal expansion coefficient that is substantially similar to the thermal expansion coefficient of the material from which heat shield 30 may be made. For example, brackets 40 may be made from substantially the same type of material as heat shield 30. This may substantially reduce the risk of undesirable stresses developing between heat shield 30 and brackets 40 due to thermal mismatch. Similarly, it may be desirable that spring clips 56 also be made from the same material or of a material having a compatible thermal expansion coefficient with that of heat shield 30 since spring clips 56 may be rigidly secured to and be in contact with heat shield 30.

Since side panels 24 may not be rigidly secured to heat shield 30, it may not be necessary that side panels 24 and heat shield 30 have the same or similar thermal expansion coefficients. Also, since side panels 24 may mainly be exposed to secondary (i.e., cold) flow 18, it may not necessary that side panels 24 have the same high-temperature resistance as heat shield. Accordingly, in some embodiments, side panels 24 may be made from a different type of material than heat shield 30. For example, side panels 24 may be made from a suitable titanium-based alloy which may be relatively lighter than a nickel-based alloy from which heat shield may be made.

During operation of engine 10 (e.g., during flight, taxi or other mode), heat shield 30 of lower aft fairing 22 may be subjected to primary (i.e., hot) flow 16 of engine 10 and side panels 24 may be subjected to secondary (i.e., cold) flow 18 of engine 10. As described above, the structure of lower aft fairing 22 may, in some embodiments, permit the thermal expansion of heat shield 30 without the inducement of significant stresses in heat shield 30 and also without significant transfer of significant forces in the structure of lower aft fairing 22. The securing of heat shield 30 to transverse ribs 28 via mid portion 30B of heat shield 30 may permit transversally opposed end portions 30A, 30C to move outwardly from mid portion 30B due to the thermal expansion of heat shield 30. For example, non-rigid connection mechanisms 36 may assist in guiding the movement of transversally opposed end portions 30A, 30C along arrows 38A and 38B respectively during thermal expansion. Such movement of transversally opposed end portions 30A, 30C during thermal expansion may, in some embodiments, permit heat shield 30 to substantially maintain its aerodynamic performance. The amount of movement of transversally opposed end portions 30A, 30C may be different at different longitudinal locations along lower aft fairing 22 depending on the geometry of heat shield 22 and also to the local temperature rise of heat shield 30 in certain regions. Accordingly, non-rigid connection mechanisms 36 and brackets 40 may be selected accordingly based on numerical modeling of the thermal expansion of heat shield 30 using conventional or other methods. Alternatively, estimation of the thermal expansion of heat shield 30 may be determined experimentally.

Also, heat shield 30 may be permitted to expand longitudinally via expansion assemblies 46 that may be disposed on some of transverse ribs 28. Again, since the thermal expansion of heat shield 30 may not be exactly uniform as determined either by numerical simulation or experimentally, it may not be necessary for expansion assemblies 46 to be located at each of transverse ribs 28. For example, since a forward end of heat shield 30 may be disposed in cold region 22A and an aft end of heat shield 30 may be disposed in hot region 22B, it may be appropriate to have the forward end of heat shield 22 rigidly secured to transverse ribs 28 and permit the thermal expansion of heat shield 30 in the aft direction. Accordingly, it may be appropriate, depending on the amount of thermal expansion, to have expansion assemblies 46 disposed on one or more transverse ribs 28F, 28G that are disposed aft of one or more other transverse ribs 28A, 28B, 28C, 28E. For example, expansion assemblies 46 disposed on one or more aft transverse ribs 28F, 28G may be configured to accommodate an accumulation of thermal expansion along heat shield 30 in embodiments where the forward end of heat shield 30 may be rigidly secured.

Expansion assemblies 46, may permit the thermal expansion of heat shield 30 along one or more degrees of freedom so as to guide the movement of heat shield 30 due to thermal expansion. For example, the thermal expansion of heat shield 30 may, in some embodiments, be guided so that the aerodynamic performance of heat shield 30 is substantially maintained.

The above description is meant to be exemplary only, and one skilled in the relevant arts will recognize that changes may be made to the embodiments described without departing from the scope of the invention disclosed. The present disclosure may be embodied in other specific forms without departing from the subject matter of the claims. Also, one skilled in the relevant arts will appreciate that while the systems, devices and assemblies disclosed and shown herein may comprise a specific number of elements/components, the systems, devices and assemblies could be modified to include additional or fewer of such elements/components. For example, while any of the elements/components disclosed may be referenced as being singular, it is understood that the embodiments disclosed herein could be modified to include a plurality of such elements/components. The present disclosure is also intended to cover and embrace all suitable changes in technology. Modifications which fall within the scope of the present invention will be apparent to those skilled in the art, in light of a review of this disclosure, and such modifications are intended to fall within the appended claims.

What is claimed is:

1. An aft fairing of a pylon where the pylon is suitable for securing an engine to structure of an aircraft, the fairing comprising:
    two opposite side panels extending generally along a longitudinal direction of the fairing;
    a plurality of transverse ribs interconnecting the two opposite side panels, the ribs being spaced apart from each other along the longitudinal direction;
    a heat shield for exposure to a primary flow of the engine, the heat shield extending generally along the longitudinal direction, the heat shield comprising transversely opposed side end portions and a mid portion disposed between the transversely opposed side end portions, the heat shield being secured to the ribs via the mid portion of the heat shield, the transversely opposed side end portions being permitted to move outwardly from the mid portion due to thermal expansion of the heat shield; and
    a non-rigid connection between the transversely opposed side end portions of the heat shield and respective ones of the side panels, wherein the non-rigid connection comprises a spring clip secured to the heat shield for cooperation with a clip secured to the side panel.

2. The aft fairing as defined in claim 1, wherein the non-rigid connection is configured to guide movement of the transversely opposed side end portions of the heat shield relative to the respective side panels.

3. The aft fairing as defined in claim 1, wherein the non-rigid connection is configured to bias the transversely opposed side end portions of the heat shield towards respective ones of the side panels.

4. The aft fairing as defined in claim 1, wherein the mid portion of the heat shield is secured to at least one of the transverse ribs via a connection permitting longitudinal movement of the mid portion of the heat shield relative to the at least one of the transverse ribs due to thermal expansion of the heat shield.

5. The aft fairing as defined in claim 4, wherein the connection permits movement of the mid portion of the heat shield relative to the at least one of the transverse ribs in only one degree of freedom.

6. The aft fairing as defined in claim 1, wherein the mid portion of the heat shield is rigidly secured to a first of the transverse ribs and the mid portion of the heat shield is also secured to a second of the transverse ribs aft of the first of the transverse ribs via a connection permitting longitudinal movement of the mid portion of the heat shield relative to the second of the transverse ribs due to thermal expansion of the heat shield.

7. The aft fairing as defined in claim 6, wherein the connection permits movement of the mid portion of the heat shield relative to the second of the transverse ribs in only one degree of freedom.

8. The aft fairing as defined in claim 1, wherein the heat shield extends across at least three transverse ribs.

9. The aft fairing as defined in claim 1, wherein the heat shield comprises a doubly curved surface.

10. The aft fairing as defined in claim 1, wherein the heat shield comprises a generally S-shaped cross-sectional profile taken along the longitudinal direction.

11. The aft fairing as defined in claim 1, wherein the heat shield comprises a generally arcuate cross-sectional profile taken along a transverse direction.

12. The aft fairing as defined in claim 1, wherein the heat shield comprises a first material and at least one of the side panels comprises a second material, the first material having a thermal expansion coefficient that is different from a thermal expansion coefficient of the second material.

13. An aft fairing of a pylon where the pylon is suitable for securing an engine to structure of an aircraft, the fairing comprising:
    two opposite side panels extending generally along a longitudinal direction of the fairing;
    a plurality of transverse ribs interconnecting the two opposite side panels, the ribs being spaced apart from each other along the longitudinal direction;
    a heat shield for exposure to a primary flow of the engine, the heat shield extending generally along the longitudinal direction, the heat shield comprising transversely opposed side end portions and a mid portion disposed between the transversely opposed side end portions, the heat shield being secured to the ribs via the mid portion of the heat shield, the transversely opposed side end portions being secured to respective ones of the side panels via a non-rigid connection permitting movement of the transversely opposed side end portions relative to the respective ones of the side panels due to thermal expansion of the heat shield; and
    a non-rigid connection between the transversely opposed side end portions of the heat shield and respective ones of the side panels, wherein the non-rigid connection comprises a spring clip secured to the heat shield for cooperation with a clip secured to the side panel.

14. The aft fairing as defined in claim 13, wherein the mid portion of the heat shield is secured to at least one of the transverse ribs via a connection permitting longitudinal movement of the mid portion of the heat shield relative to the at least one of the transverse ribs due to thermal expansion of the heat shield.

15. The aft fairing as defined in claim 14, wherein the connection permits movement of the mid portion of the heat shield relative to the at least one of the transverse ribs in only one degree of freedom.

16. The aft fairing as defined in claim 13, wherein the mid portion of the heat shield is rigidly secured to a first of the transverse ribs and the mid portion of the heat shield is also secured to a second of the transverse ribs aft of the first of the transverse ribs via a connection permitting longitudinal movement of the mid portion of the heat shield relative to the second of the transverse ribs due to thermal expansion of the heat shield.

17. The aft fairing as defined in claim 13, wherein the heat shield extends across at least three transverse ribs.

18. An aft fairing of a pylon where the pylon is suitable for securing an engine to structure of an aircraft, the fairing comprising:
two opposite side panels extending generally along a longitudinal direction of the fairing;
a plurality of transverse ribs interconnecting the two opposite side panels, the ribs being spaced apart from each other along the longitudinal direction; and
a heat shield for exposure to a primary flow of the engine, the heat shield extending generally along the longitudinal direction, the heat shield comprising transversely opposed side end portions and a mid portion disposed between the transversely opposed side end portions, the mid portion of the heat shield being secured to at least one of the transverse ribs via a connection permitting longitudinal movement of the mid portion of the heat shield relative to the at least one of the transverse ribs due to thermal expansion of the heat shield,
a bracket rigidly secured to the heat shield, the bracket being movably secured to the at least one of the transverse ribs via an expansion assembly, wherein the expansion assembly comprises a spacer rigidly secured to the transverse rib and extending through a hole in the bracket, the hole being sized to permit sliding of the bracket relative to the spacer.

19. The aft fairing as defined in claim 18, wherein the connection permits movement of the mid portion of the heat shield relative to the at least one of the transverse ribs in only one degree of freedom.

20. The aft fairing as defined in claim 18, wherein the mid portion of the heat shield is rigidly secured to a first of the transverse ribs and the mid portion of the heat shield is also secured to a second of the transverse ribs aft of the first of the transverse ribs via the connection permitting longitudinal movement of the mid portion of the heat shield relative to the second of the transverse ribs due to thermal expansion of the heat shield.

21. The aft fairing as defined in claim 18, comprising a non-rigid connection between the transversely opposed side end portions of the heat shield and respective ones of the side panels.

22. The aft fairing as defined in claim 21, wherein the non-rigid connection is configured to bias the transversely opposed side end portions of the heat shield towards respective ones of the side panels.

23. The aft fairing as defined in claim 18, wherein the heat shield extends across at least three transverse ribs.

24. The aft fairing as defined in claim 18, wherein the heat shield comprises a doubly curved surface.

25. The aft fairing as defined in claim 18, wherein the heat shield comprises a generally S-shaped cross-sectional profile taken along the longitudinal direction.

26. The aft fairing as defined in claim 18, wherein the heat shield comprises a generally arcuate cross-sectional profile taken along a transverse direction.

27. An aircraft comprising the aft fairing as defined in claim 1.

28. A pylon comprising the aft fairing as defined in claim 1.

* * * * *